United States Patent
Hecht et al.

(10) Patent No.: US 10,427,985 B1
(45) Date of Patent: Oct. 1, 2019

(54) ENGINEERED MICRO-VOIDS FOR TOUGHENING CERAMIC COMPOSITES

(71) Applicant: Lockheed Martin Corporation, Bethesda, MD (US)

(72) Inventors: Daniel H. Hecht, Fort Worth, TX (US); Antonio P. De La Garza, III, Hudson Oaks, TX (US)

(73) Assignee: Lockheed Martin Corporation, Menlo Park, CA (US)

( * ) Notice: Subject to any disclaimer, the term of this patent is extended or adjusted under 35 U.S.C. 154(b) by 0 days.

(21) Appl. No.: 15/912,857

(22) Filed: Mar. 6, 2018

(51) Int. Cl.
  *C04B 38/00* (2006.01)
  *B82Y 30/00* (2011.01)
  *B82Y 40/00* (2011.01)

(52) U.S. Cl.
  CPC ........ *C04B 38/0061* (2013.01); *C04B 38/009* (2013.01); *C04B 38/0054* (2013.01); *B82Y 30/00* (2013.01); *B82Y 40/00* (2013.01); *Y10S 977/75* (2013.01); *Y10S 977/78* (2013.01); *Y10S 977/847* (2013.01)

(58) Field of Classification Search
  CPC . C04B 38/0054; C04B 38/0061; B82Y 30/00; B82Y 40/00
  See application file for complete search history.

(56) References Cited

U.S. PATENT DOCUMENTS

| | | | |
|---|---|---|---|
| 8,158,217 B2 | 4/2012 | Shah et al. | |
| 8,168,291 B2 | 5/2012 | Shah et al. | |
| 8,669,035 B2* | 3/2014 | Sun | G03G 9/0804 |
| | | | 430/108.1 |
| 9,074,066 B2 | 7/2015 | Park et al. | |
| 9,587,089 B2* | 3/2017 | Park | B82Y 30/00 |
| 2006/0026996 A1 | 2/2006 | Chen | |
| 2013/0171441 A1 | 7/2013 | Hecht et al. | |
| 2014/0339168 A1 | 11/2014 | Hong et al. | |
| 2015/0307691 A1 | 10/2015 | Park et al. | |
| 2016/0176156 A1 | 6/2016 | Xu | |

OTHER PUBLICATIONS

Martin-Gullon, et al.; Differences between carbon nanofibers produced using FE and Ni catalysts in a floating catalyst reactor, www.sciencedirect.com; Carbon, vol. 44; Jul. 2006, 1572-1580.

* cited by examiner

*Primary Examiner* — Karl E Group
(74) *Attorney, Agent, or Firm* — Baker Botts L.L.P.

(57) ABSTRACT

A ceramic composite material comprises a ceramic compound, a plurality of shaping particles dispersed in the ceramic compound, and a plurality void spaces dispersed in the ceramic compound. The plurality of shaping particles are contained within the plurality of void spaces, and each of the plurality of void spaces is a closed cell. The plurality of shaping particles also comprise nanostructures have a length to diameter ratio of less than or equal to 10 to 1 and a length of less than or equal to 500 nanometers.

9 Claims, 4 Drawing Sheets

ENGINEERED MICRO-VOIDS FOR TOUGHENING CERAMIC COMPOSITES

TECHNICAL FIELD OF THE INVENTION

This invention relates generally to ceramic composite materials.

BACKGROUND

Structural composites are materials that have generally been developed in attempts to combine desirable properties of two or more different types of materials. A common example of a composite is reinforced concrete, in which steel bars (rebar) are arranged within a concrete matrix. The rebar provides tensile strength to the composite, compensating for concrete's lower tensile strength. Another common example of a composite material is the material commonly referred to as "carbon fiber," and more properly referred to as carbon fiber reinforced plastic, which is a reinforced plastic composite with a plastic material serving as a matrix material to bind reinforcing carbon fibers distributed throughout the plastic matrix material. Other reinforced plastic materials may include other reinforcing fibers or particles distributed throughout the plastic matrix. Typically, the properties of composite materials are a compromise of the individual materials that are combined to form the composite. For example, a carbon fiber reinforced plastic may be stronger that the plastic matrix material, but weaker than the individual carbon fibers. It also may be tougher than the carbon fibers, but not as tough as the plastic matrix material.

Ceramic matrix composite (CMC) materials have been developed with similar objectives, but have evolved in different ways to address certain material properties. CMC materials include a ceramic matrix material and a ceramic reinforcement material, where the reinforcement material is typically in the form of long fibers. In addition to adding some of their strength or other properties to the overall composite material, the reinforcing fibers may also interrupt crack propagation through the matrix material. Many ceramics are brittle in nature and cracking due to fatigue, impact, or thermal shock may be a primary weakness of ceramic materials.

SUMMARY

According to one embodiment, a ceramic composite material comprises a ceramic compound, a plurality of shaping particles dispersed in the ceramic compound and a plurality of void spaces dispersed in the ceramic compound. The plurality of shaping particles are contained within the plurality of void spaces, and each of the plurality of void spaces is a closed cell. The shaping particles also comprise nanostructures have a length to diameter ratio of less than or equal to 10 to 1 and a length of less than or equal to 500 nanometers.

According to another embodiment, a ceramic matrix material includes a ceramic compound with a plurality of void spaces dispersed in the ceramic compound. The void spaces have a length to diameter ratio of less than or equal to 10 to 1 and a length of less than or equal to 500 nanometers. Each of the plurality of void spaces is a closed cell, and the void spaces and have irregular, non uniform shapes.

According to another embodiment, a method producing a ceramic composite material includes the steps of (1) treating nanofibers to remove pyro-carbon, (2) mixing nanofibers with a first preceramic resin to form a first preceramic resin mixture, (3) curing the first preceramic resin mixture, (4) pyrolyzing the cured first preceramic resin mixture to form a nanofiber containing ceramic composite, (5) grinding the nanofiber containing ceramic composite into ceramic composite particles, (6) cleaning the ceramic composite particles, (7) drying the ceramic composite particles, (8) surfaces treating the ceramic composite particles, (9) coating the ceramic particles with a sealant, (10) mixing the ceramic particles with second preceramic resin to form a second preceramic resin mixture, (11) curing the second preceramic resin mixture, and (12) pyrolyzing the second preceramic resin mixture to form a closed cell ceramic composite.

Technical advantages of certain embodiments may include forming a ceramic matrix composite with a closed cell structure having voids engineered to provide desirable strain to failure characteristics. These desirable characteristics may include high toughness and tolerance to a degree of elongation. Additionally, a ceramic matrix composite with a closed cell structure may be more resistant to corrosive or oxidative environments than a ceramic matrix composite with an open cell.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Ceramic matrix composites (CMCs) are composite materials that include reinforcing fibers, which are often ceramic material themselves, distributed through a ceramic matrix. By providing void spaces within the ceramic matrix, the toughness of the ceramic matrix may be increased relative to ceramic matrices without void spaces. By providing void spaces with a closed cell structure, meaning that each void space is isolated from other void spaces, a ceramic matrix may demonstrate increased corrosion and oxidation resistance when compared to a ceramic matrix with an open cell structure. Corrosion resistance may be desirable for application in flight structures and combustion engines, such as automotive internal combustion engines and turbine engines commonly used in the aerospace, marine, and power generation industries. Combustion gasses and exhaust are often highly corrosive, so a ceramic matrix material that is resistant to corrosion is desirable for such applications. Additionally, many chemical processes utilize corrosive chemicals and oxidizers. Therefore, corrosion resistant ceramic matrix materials may be advantageous for use in the chemical industry as well.

The ceramic matrix composites disclosed herein use control of multi-scale void structures to reduce the modulus (stiffness) and increase strain capability of the ceramic matrix composite. Highly ordered and nested low modulus particulates or voids may produce alignment in the ligaments within the ceramic matrix composite thereby increasing deformation resistance and reducing failure elongation in one or more directions. In the ceramic matrix composites disclosed herein, irregular particles may prevent alignment of the ligaments allowing loads to deflect non-aligned elements at reduced stress levels, increasing the elongation to failure. While non-irregular particles or voids may produce a flexible ceramic matrix in some cases or orientations, the use of irregular shapes may increase elongation and the number of ceramic materials which can produce a superior ceramic matrix and ceramic matrix composite material.

Figure 1:
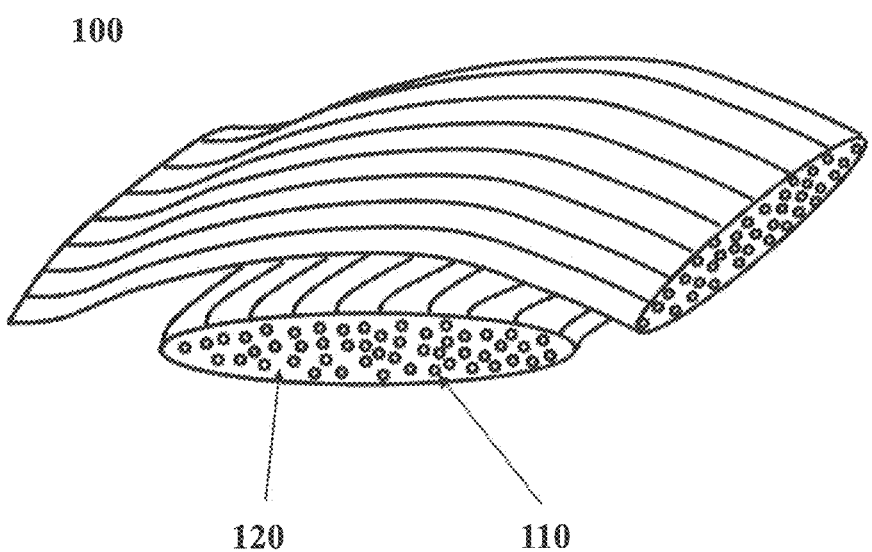
FIG. 1 illustrates a cross section of a ceramic matrix composite, according to certain embodiments.

FIG. 1 illustrates a cross section of a ceramic matrix composite 100, according to certain embodiments. The ceramic matrix composite 100 includes a plurality of reinforcing fibers 110 embedded in a matrix material 120. Both the reinforcements 110 and the matrix material 120 may be selected from a variety of materials to tailor the properties of the ceramic matrix composite 100. Reinforcing fibers 110 may be reinforcements having a generally uniform cross-section along their longest dimension, a smallest cross-sectional dimension of about 5 µm or greater, and an aspect ratio greater than about 1000 with respect to the largest cross-sectional dimension. Reinforcing fiber aspect ratios may be much larger, and in some embodiments may be practically infinite where continuous fiber reinforcements are used. Reinforcing fibers 110 may be formed from materials such as ceramics, metals, polymers, or glass. Some examples of suitable materials for reinforcing fibers 110 for use in ceramic matrix composites include carbon, silicon carbide, alumina, quartz, and mixed oxide materials such as mullite (alumina-SiO2). In one particular embodiment, the reinforcing fibers 110 have a diameter that ranges from about 5 µm to about 15 µm and are at least several centimeters in length.

In the illustrated embodiment, the reinforcing fibers 110 are generally aligned with each other in the portion shown, which may impart the ceramic matrix composite 100 with directional properties. For example, ceramic matrix composite 100 may have a greater tensile strength in the direction of alignment than in a direction transverse to the direction of alignment. Multiple layers of composite material having aligned reinforcements may be layered together to form a laminar composite article, where the reinforcements in each layer oriented in a different direction from adjacent layers. For example, a first layer of composite material may have its reinforcements aligned as shown in FIG. 1. An overlying layer with its reinforcements aligned at a 90 degree angle to the reinforcements of the first layer is also shown in FIG. 1. A ceramic matrix composite 100 may include other overlying layers in addition to those shown in FIG. 1. For example, another layer may have its reinforcements aligned at a 45 degree angle to each of the two layers shown in FIG. 1, and other additional layers may have reinforcing fibers oriented at any angle relative to the other layers.

In some embodiments, individual layers of composite material include reinforcing fibers 110 oriented in multiple directions to provide properties that are approximately the same in every direction. In other embodiments, the reinforcing fibers 110 may be woven, braided, otherwise arranged together to form a structure that can be practically handled in a manufacturing environment prior to being embedded in the matrix material and result in generally aligned reinforcements in the finished composite material. Skilled artisans will recognize the wide variety of long fiber reinforcement materials, shapes, and configurations that may be used consistent with the teachings presented herein. Some examples of composite articles include structural components such as aircraft components, automobile components, boat components, and building materials.

Figure 2:
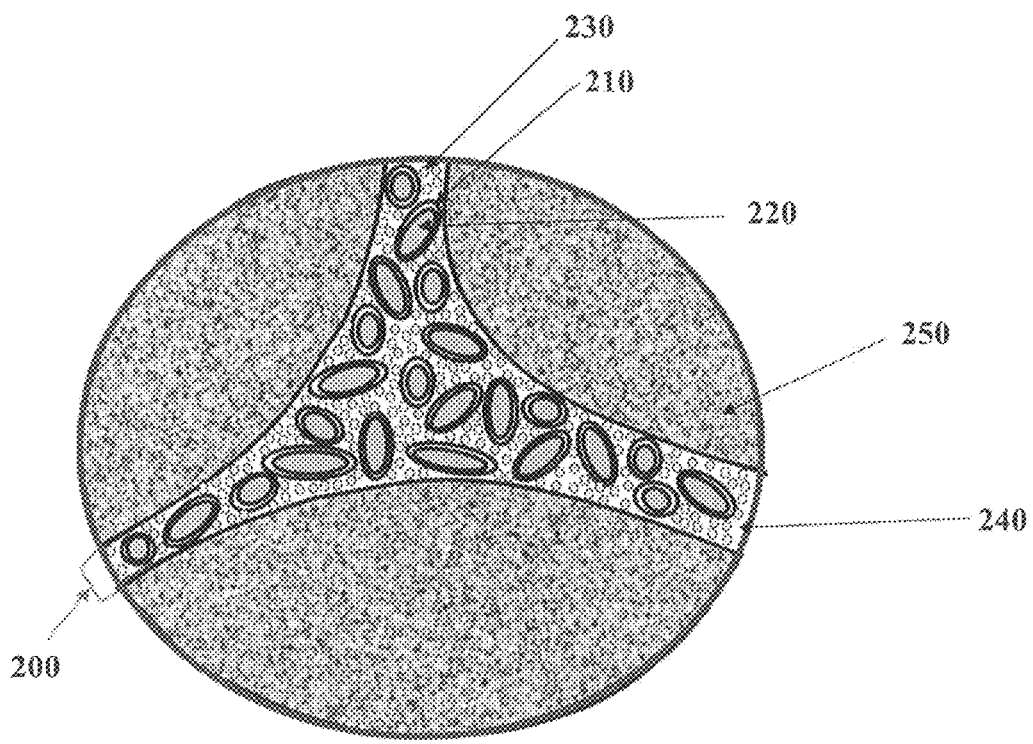
FIG. 2 illustrates a cross section of a ceramic matrix composite at a sub-micron scale, according to certain embodiments.

FIG. 2 illustrates a cross section of a ceramic matrix composite at a sub-micron scale, such as ceramic matrix composite 100 of FIG. 1, according to certain embodiments. The ceramic matrix composite includes ceramic matrix material 200 and reinforcing fibers 250. Ceramic matrix material 200 may be used as the matrix material 120 of ceramic matrix composite 100 of FIG. 1 and reinforcing fibers 250 may correspond to reinforcing fibers 110 of FIG. 1. The ceramic matrix material 200 may include large voids 210, shaping particles 220, small voids 230, and ceramic binder 240. Ceramic binder 240 may surround void spaces 210, shaping particles 220, and small voids 230. In some embodiments, all or some of large voids 210, shaping particles 220, and small voids 230 may be present in ceramic matrix material 200. For example, a ceramic matrix material may be formed that does not have small voids 230. As another example, a ceramic matrix material 200 may be formed in which shaping particles 220 evaporate or off-gas during pyrolysis of ceramic matrix material 200, leaving large voids 210.

The ceramic binder 240 serves to hold large voids 210, shaping particles 220, and small voids 230 in place, and together with these structures, forms ceramic matrix material 200. In some embodiments, ceramic binder 240 may have a composition similar to known CMC matrix materials, such as carbon, silicon carbide, alumina, or mixed oxide materials.

Figure 3:
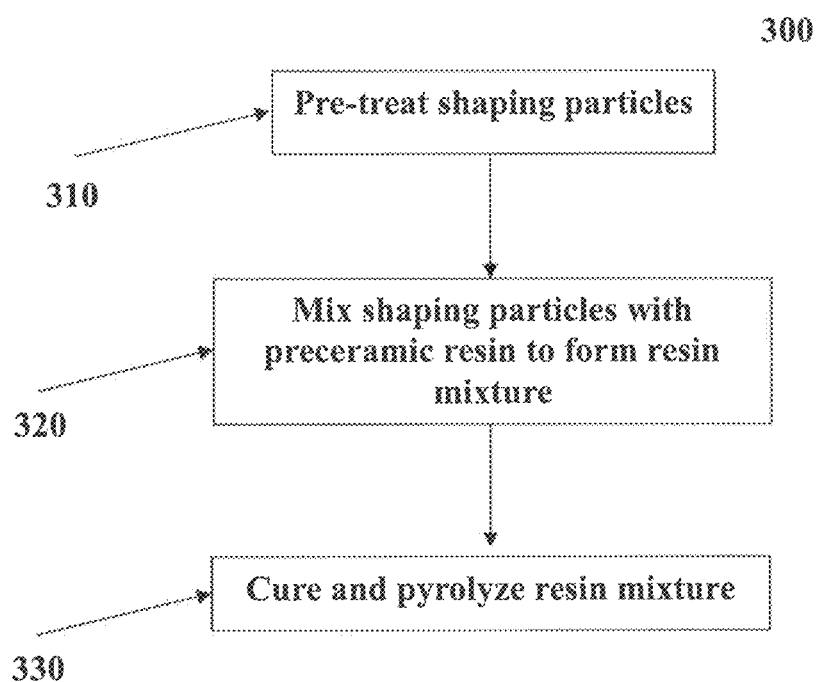
FIG. 3 illustrates a method for creating a closed cell ceramic matrix composite, according to certain embodiments.
Figure 4:
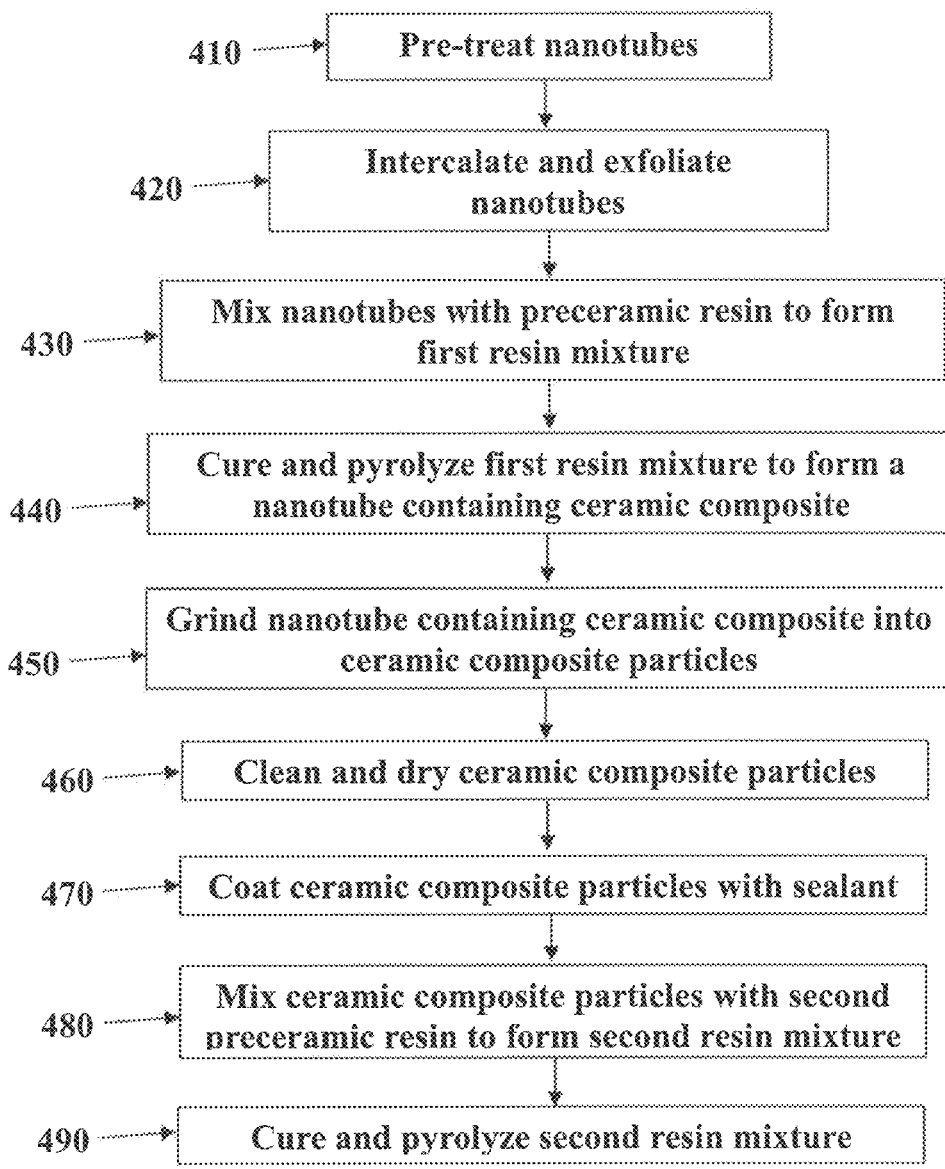
FIG. 4 illustrates a method for creating a closed cell ceramic matrix composite using ceramic matrix shaping particles, according to certain embodiments.

Ceramic matrix material 200 may be formed according to the methods described herein with respect to method 300 of FIG. 3 and method 400 of FIG. 4. In some embodiments, shaping particles 220 may be mixed into a preceramic resin prior to pyrolysis of the preceramic resin mixture to form ceramic matrix material 200.

Large voids 210 may surround shaping particles 220 and have a shape similar to the shape of shaping particles 220. Shaping particles 220 may shrink when ceramic matrix composite 200 is formed, resulting in large voids 210 surrounding shaping particles 220 and acting as a "cage" for shaping particles 220.

In some embodiments, shaping particles 220 are selected to have a small enough length to diameter ratio to form a closed cell foam when included in ceramic matrix material 200. In certain embodiments, shaping particles 220 may have a length to diameter ratio of less than 10 to 1. In particular embodiments, shaping particles 220 may have a length to diameter ratio of less than 4 to 1. In other embodiments, shaping particles 220 may be approximately spherical. Shaping particles 220 may have a length less than 500 nanometers. In certain embodiments the shaping particles 220 may have a length less than 200 nanometers. In particular embodiments, the shaping particles 220 may have a length greater than or equal to 50 nanometers and less than or equal to 100 nanometers.

Shaping particles 220 may have an irregular or non-uniform shape. Although many shapes of particles may be irregular or non-uniform for the purposes of this disclosure, examples of shapes that would not qualify as irregular or non-uniform include spheres, cubes, and tubes or cylinders having identical lengths. Shaping particles 220 with an irregular or non-uniform shape may resist nesting, and result in formation of voids 210 with an irregular shape. Voids 210 having irregular, non-uniform shapes may result in a ceramic matrix material 200 having the preferred structural properties when compared to a ceramic matrix material with uniform void spaces. Irregularly shaped, non-uniform void spaces 210 may reduce efficient load paths throughout ceramic matrix 200. By reducing efficient load paths, void spaces 210 may prevent failure of ceramic matrix material 200 when placed under strain and stop crack propagation through ceramic matrix material 200 resulting from such strain. In some embodiments, void spaces 210 containing shaping particles 220 that are slightly smaller than void spaces 210 may reduce efficient load paths throughout ceramic matrix material 200 because the shaping particles 220 are not able to transmit load applied to void spaces 210. In certain embodiments, shaping particles 220 that are between 5% and 10% smaller than void spaces 210 may be desirable. In other embodiments, shaping particles 220 that are more than 5% smaller than void spaces 210 may be desirable. In yet other embodiments, shaping particles 220 that are more than 10% smaller than void spaces 210 may be desirable.

Additionally, the closed cell structure of ceramic matrix material 200 may make it particularly resistant to corrosive or oxidative environments. Unlike an open cell ceramic matrix, corrosive gasses may have low or zero permeability into the closed void spaces 210 of ceramic matrix 200. This property of ceramic matrix 200 may be desirable in applications such as automotive engines, power plants, jet engines, and chemical plants where a ceramic matrix composite utilizing ceramic matrix 200 may be used in an environment containing hot gases, which may corrode or oxidize a conventional ceramic matrix material.

Additionally, impermeability of the ceramic matrix composite may be enhanced by the addition of glass forming refractory metals with varied oxidation temperatures. Oxygen leakage into the ceramic matrix composite at temperature may react with these glass formers, sealing the porosity path and stopping further oxidation. Including a range of reactive metals (metaloids) including, but not limited to boron, silicon, zirconium, hafnium may provide low to high temperature glasses to effectively seal the matrix at application temperatures.

Shaping particles 220 may include carbon nanofibers such as stacked nano-cups or nanotubes, ceramic fibers, ceramic matrix particles, polymer beads, spun fibers, sugar, microcrystalline cellulose, and phenolic polymers. In some embodiments, shaping particles 220 made from polymer materials having a low char yield, such as sugar or microcrystalline cellulose, may be desirable to prevent the formation of carbon char in void spaces 210 formed in the ceramic matrix. In particular embodiments, shaping particles 220 may be coated with a release agent prior to mixing with a preceramic resin. A release agent may enhance separation by shaping particles 220 from the ceramic binder 240 during pyrolysis of a preceramic resin to form ceramic matrix material 200.

In other embodiments, shaping particles 200 may be a fugitive material. During pyrolysis of a preceramic resin mixture containing shaping particles 220, fugitive shaping particles 220 may evaporate, char, or otherwise chemically react to form a void 210 that does not contain a shaping particle 220 or contains trace amounts of shaping particle 220.

Small voids 230 may be optionally present in ceramic matrix material 200. In some embodiments, small voids 230 may serve to soften ceramic matrix material 200, providing a reduction in brittleness if desired. In some embodiments, small voids may be formed from introduction of particles smaller than shaping particles 220 into a preceramic resin prior to pyrolysis of the preceramic resin. In other embodiments, small voids 230 may be formed by natural cracking that occurs during conversion of the preceramic resin to ceramic binder 240 during pyrolysis. Preceramic resin may shrink during pyrolysis resulting in small voids 230 that form due to localized uneven shrinking in ceramic matrix material 200.

FIG. 3 illustrates a method 300 for creating a closed cell ceramic matrix composite, according to certain embodiments.

Method 300 begins at step 310, with shaping particles being treated prior to addition to a preceramic resin used to form a CMC. Treatment of the shaping particles may include removing excess carbon from the shaping particles, when the shaping particles are carbon nanofibers. Treatment may also include segregating shaping particles to obtain shaping particles with a desired range of lengths and length to diameter ratios as described below. At this step, the shaping particles may also be coated with a release agent to aid in separation from the preceramic resin during pyrolysis.

In some embodiments, shaping particles are selected to have a small enough length to diameter ratio to form a closed cell foam when included in a CMC. In certain embodiments, shaping particles may have a length to diameter ratio of less than 10 to 1. In particular embodiments, shaping particles may have a length to diameter ratio of less than 4 to 1. In other embodiments, shaping particles may be approximately spherical. Shaping particles may have a length less than 500 nanometers. In certain embodiments, the shaping particles may have a length less than 200 nanometers. In particular embodiments, the shaping particles may have a length greater than or equal to 50 nanometers and less than or equal to 100 nanometers.

The shaping particles are preferably smooth, and may shrink during pyrolysis of the preceramic resin, resulting in a ceramic matrix material with void spaces that are slightly larger and surround the shaping particles after pyrolysis. Shaping particles may include carbon nanofibers, such as stacked nano-cups or nanotubes, ceramic fibers, ceramic matrix particles, polymer beads, spun fibers, sugar, microcrystalline cellulose, and phenolic polymers. In some embodiments, shaping particles made from polymer materials having a low char yield, such as sugar or microcrystalline cellulose, may be desirable to prevent formation of carbon char in void spaces formed in the ceramic matrix.

At step 320, the shaping particles may be mixed into a preceramic resin used to form the ceramic matrix of a ceramic matrix composite. In some embodiments, the shaping particles may be incorporated into the preceramic resin at a volume fraction (VF) greater than or equal to 0.2 and less than or equal to 0.5. The shaping particles may be agitated during mixing with the preceramic polymer to prevent aggregation of the shaping particles and to ensure even distribution of the shaping particles throughout the preceramic resin. After mixing the shaping particles with the preceramic resin, the preceramic resin may be mixed into reinforcing fibers of the ceramic matrix composite.

Next, at step 330, the preceramic resin may be cured and pyrolyzed. Curing the preceramic resin may convert the preceramic resin into a solid, which may simplify handling, before the preceramic resin mixture is pyrolyzed to convert the preceramic resin mixture to a ceramic matrix. After curing, the preceramic resin-shaping particle-reinforcing fiber mixtures may be pyrolyzed. Pyrolysis converts the cured preceramic resin to a ceramic matrix. During pyrolysis, the preceramic resin may shrink. In some embodiments, the shaping particles may shrink during pyrolysis as well.

FIG. 4 illustrates a method 400 for creating a closed cell ceramic matrix composite using ceramic matrix shaping particles, according to certain embodiments.

The preferred ceramic matrix shaping particle precursors to formulate the closed cell ceramic matrix composite are nano-structures of geometries that enable high elongation nano-/meso-structure elements to be created with brittle ceramic (carbon) materials. Communication of multi-wall carbon nanotubes (CNTs) and Stacked-Cup (CS-) CNTs smaller than the final particulate size may be used to create a skeleton of low density shell/cup structures. The extreme transverse elongation capability of this skeleton can then be bonded into high elongation agglomerates with the pre-ceramic matrix resin with high strength, nano-/sub-micron bonding elements. This may require dimensional and surface functionality control of the constituents to determine the scale and bond strength of the elements. A bonded skeleton of nano-/ sub-micron scale constituents may reduce defect density, producing a flexible, ceramic toughening particle, such as shaping particles 220 of FIG. 2, which in turn, toughens the overall ceramic matrix composite, such as ceramic matrix material 200, sufficiently to exceed the elongation of the reinforcing fibers.

At step 410, nano-structures such as nanofibers, including stacked nano-cups or nanotubes, are treated prior to being mixed into a preceramic resin to allow subsequent processing and affect matrix performance. At step 410, excess pyro-carbon which may have formed during production of the narofibers may be removed from the surface of the nanofibers. Removing excess pyro-carbon may be accomplished by a variety of methods, including, but not limited to, oxidation of the excess pyro-carbon. Removing excess pyro-carbon may expose the basal plane edges of the nanofibers. In some embodiments nanofibers may have a diameter greater than or equal to three nanometers and less than or equal to fifty nanometers. In particular embodiments, the nanofibers may be 'GANFI' SC-CNT's produced by Grupo-Antolin' with minimal pyrocarbon coating. In some embodiments, smaller fractions of the nanofibers having a length of less than or equal to twenty-five nanometers may be preferred.

At step 420, the nanofibers are intercalated and exfoliated to produce nanofibers with a desired length to diameter ratio. First the nanofibers may be intercalated by many methods, including, but not limited to application of sulfamic acid. Next the nanofibers may be rapidly exfoliated to produce single and multi-walled "stacked cup" sections of nanofibers. Rapidly exfoliating the nanofibers may generate sufficient internal pressure within the nanofibers to cause the nanofibers to become arranged in a "stacked cups" configuration. After exfoliating the nanofibers, nanofibers and stacked cup arrangements having a desired length to diameter ratio may be separated. For example, it may be desirable to choose a sufficiently high length to diameter ratio such that the nanofibers form an open cell foam structure when added to a preceramic resin and pyrolyzed. In certain embodiments the nanofiber length may be greater than or equal to 10 nanometers and less than or equal to 500 nanometers.

Next, at step 430, a preceramic resin may be formulated by mixing the nanofibers treated in steps 410 and 420 with a binder preceramic resin. In some embodiments, the binder used may be the minimum necessary to bind to the nanofibers. In certain embodiments, the binder may account for less than 2% of the volume of the binder-nanofiber preceramic resin mixture. Using a minimum of binder may provide a resultant ceramic composite with flexibility and enhance the ability to grind the resultant ceramic composite into small particulate sizes.

At step 440, the binder-nanofiber preceramic resin mixture may be cured and pyrolyzed to form an open cell ceramic composite foam. First, the binder-nanofiber preceramic resin mixture may be cured to convert the mixture to a solid. Next the solid binder-nanofiber preceramic resin mixture may undergo pyrolysis to convert the preceramic resin to a ceramic. During pyrolysis, the hollow spaces of the nanofibers may provide for formation of interconnected voids in the ceramic, forming an open cell ceramic composite foam with a nanofiber "skeleton." In some embodiments, after pyrolysis, the open cell ceramic composite foam may be proof tested to ensure it demonstrates desirable characteristics. For example, the open cell ceramic composite foam may be compressed by greater than 10% to ensure that the open cell ceramic composite foam demonstrates required elongation and compressibility without failing.

At step 450, the open cell ceramic composite foam formed at step 440 may be ground into small particles. In some embodiments, the open cell ceramic composite foam may be ground into particles having an average diameter less than 300 nanometers. In particular embodiments, the cell ceramic composite foam may be ground into particles having an average diameter greater than or equal to 100 nanometers and less than or equal to 200 nanometers. A high shear ball mill with a mixture of medium and small milling media may, in some embodiments, achieve either of these averages sizes efficiently. However, any suitable method could be used for grinding the open cell ceramic composite foam to the desired particle size.

At step 460, the open cell ceramic composite foam particles may be cleaned and dried. During cleaning, any lubricant from the milling process, dirt, or particle fines too small to be of use may be removed from the open cell ceramic composite foam particles. After the open cell ceramic composite foam particles may be dried to remove any remaining liquid, such as water, alcohol, organic solvents, or oils that were used to clean the particles. Additionally, at step 460, the open cell ceramic composite foam particles may be further separated to obtain particles with a desired size distribution.

At step 470, the open cell ceramic composite foam particles may be coated with a sealant. The sealant may be applied to the outer surface of the open cell ceramic composite foam particles to prevent the preceramic resin applied in step 480 from penetrating into the interior void volume of the open cell ceramic composite foam particles. In some embodiments, the open cell ceramic composite foam particles may be surface treated or heat treated to control the wettability of the open cell ceramic composite foam particles prior to sealing the open cell ceramic composite foam particles. Controlling the wettability of the open cell ceramic composite foam particles may ensure than the sealant coats the surface of the open cell ceramic composite foam particles and seals the interior void spaces of the open cell ceramic composite foam particles without penetrating the void spaces. In other embodiments, the open cell ceramic composite foam particles may be treated with a non-wetting agent such as a silicone or other release agent commonly used in composites. In some embodiments a coupling agent may be added to the surface of the open cell ceramic composite foam particle to control bonding of the open cell ceramic composite foam particles to the ceramic matrix formed in steps 480 and 490 described below.

At step 480, the final preceramic matrix resin may be formulated by mixing the open cell ceramic composite foam particles with a preceramic resin. The open cell ceramic composite foam particles may be added to the preceramic resin in an amount sufficient to produce desired properties in the final ceramic matrix composite. These properties may include a desired strain to failure ratio, or a desired flexibility. In some embodiments, the volume fraction of the open cell ceramic composite foam particles added to the preceramic resin may be selected to ensure a desired volume fraction of void spaces in the final ceramic matrix material. In particular embodiments, the open cell ceramic composite foam particles may be incorporated into the preceramic resin at a volume fraction (VF) greater than or equal to 0.2 and less than or equal to 0.5.

At step 480, the final preceramic matrix resin may be cured and pyrolyzed to form the final ceramic matrix material. In some embodiments, the final preceramic matrix resin formulated in step 280 may be added to reinforcing fibers, such as reinforcing fibers 120 of FIG. 1, prior to curing and pyrolysis to form a ceramic matrix composite after pyrolysis. As with step 440, curing the final preceramic matrix resin at step 480 may solidify the final preceramic matrix resin prior to pyrolysis. Pyrolysis of the cured final preceramic matrix resin may result in a ceramic matrix material having a closed cell structure similar to that illustrated in FIG. 2. In some embodiments, the final preceramic matrix resin and the open cell ceramic composite foam particles contained within the preceramic resin may shrink during pyrolysis. Shrinkage of the open cell ceramic composite foam particles may result in void spaces slightly larger than the open cell ceramic composite foam particles in final ceramic matrix. Shrinkage of the final preceramic matrix resin may increase the volume fraction of void spaces and the open cell ceramic composite foam particles to more than 0.5, in some embodiments.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A ceramic composite material comprising:
   a ceramic compound;
   a plurality of shaping particles dispersed in the ceramic compound; and
   a plurality of a first type of void spaces dispersed in the ceramic compound;
   wherein:
      the plurality of shaping particles are contained within the plurality of the first type of void spaces;
      the shaping particles comprise nanostructures have a length to diameter ratio of less than or equal to 10 to 1 and a length of less than or equal to 500 nanometers; and
      each of the plurality of the first type of void spaces is a closed cell.

2. The ceramic composite material of claim 1, wherein the shaping particles are single walled carbon nanotubes.

3. The ceramic composite material of claim 1, further comprising a plurality of a second type of void space dispersed in the ceramic compound, wherein the second type of void space is smaller than the first type of void space.

4. The ceramic composite material of claim 1, wherein the shaping particles comprise fugitive materials.

5. The ceramic composite material of claim 1, wherein the shaping particles comprise an open cell ceramic composite foam.

6. The ceramic composite material of claim 1, wherein the shaping particles have a length less than or equal to 100 nanometers.

7. The ceramic composite material of claim 1, wherein the shaping particles have an irregular shape.

8. The ceramic composite material of claim 3, wherein the plurality of the first type of void spaces and the plurality of the second type of void spaces have a volume fraction greater than 0.5 of the ceramic composite material.

9. The ceramic composite material of claim 1, further comprising reinforcing fibers dispersed in the ceramic compound.

* * * * *